[91.]

A. W. BUNNELL.
Lock-Nut for Bolts.

No. 118,684. Patented Sep. 5, 1871.

Witness
A. B. Richmond
Geo. O. Morgan.

Inventor
Aaron Whited Bunnell

UNITED STATES PATENT OFFICE

AARON WHITED BUNNELL, OF LINESVILLE, PENNSYLVANIA.

IMPROVEMENT IN LOCK-NUTS.

Specification forming part of Letters Patent No. 118,684, dated September 5, 1871.

*To all whom it may concern:*

Be it known that I, AARON WHITED BUNNELL, of Linesville, in the county of Crawford, in the State of Pennsylvania, have invented a new and Improved Lock-Nut for Screw-Bolts; and I do hereby declare that the following is a full and exact description of the same, reference being had to the accompanying drawing and the letters of reference marked thereon.

The object of my invention is to so construct a bolt and nut, that the nut will not unscrew by the jar of machinery or any other cause, and at the same time be easily released and unscrewed when desired.

Figure 1:
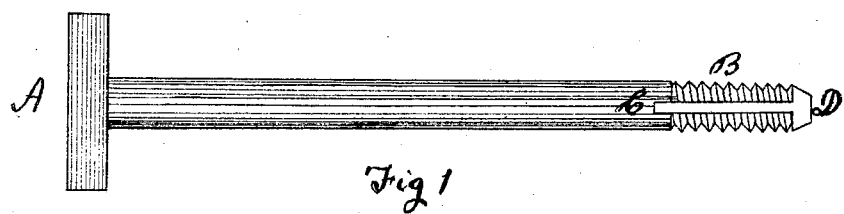

Figure 1, A represents the bolt with the nut removed.

At the screw end B is a key-seat, C D, cut a little longer than the screw-thread. In this key-seat is fitted a key, E, with an arm, F, which, when the key is in its place, will drop into or between the threads of the screw and will thus be fastened or locked.

In large screws this arm F may be attached to the body of the key E by a joint or hinge, so that it can be turned up or down between the threads easily. In smaller screws it may be a spring. There is also a key-seat in the nut.

Figure 2:
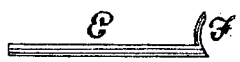
Figure 2:

Fig. 2 shows a bolt with the nut on and the key E in its seat.

What I claim as my invention, and desire to secure by Letters Patent of the United States, is as follows, to wit:

The screw-bolt with the key-seat, in combination with the key E, constructed with the arm or catch F, when constructed as described, for the purposes set forth.

AARON WHITED BUNNELL.

Witnesses:
    A. B. RICHMOND,
    GEO. O. MORGAN.